(12) United States Patent
Oberhausen et al.

(10) Patent No.: US 7,806,219 B2
(45) Date of Patent: Oct. 5, 2010

(54) AXLE DRIVE UNIT FOR A DRIVE TRAIN

(75) Inventors: Bernd Oberhausen, Wegberg (DE); Hans-Peter Nett, Adenau (DE); Werner Hoffmann, Siegburg (DE)

(73) Assignee: GETRAG Driveline Systems GmbH, Cologne (DE)

( * ) Notice: Subject to any disclaimer, the term of this patent is extended or adjusted under 35 U.S.C. 154(b) by 341 days.

(21) Appl. No.: 11/833,916

(22) Filed: Aug. 3, 2007

(65) Prior Publication Data
US 2008/0035405 A1    Feb. 14, 2008

(30) Foreign Application Priority Data
Aug. 9, 2006    (DE)    .................. 10 2006 038 358

(51) Int. Cl.
*B60K 17/354*    (2006.01)
(52) U.S. Cl. .................. 180/245; 180/251; 475/198; 475/205; 475/207
(58) Field of Classification Search .................. 180/245, 180/251; 475/205, 207, 198
See application file for complete search history.

(56) References Cited

U.S. PATENT DOCUMENTS

| | | | |
|---|---|---|---|
| 1,273,519 A | | 7/1918 | Millington |
| 5,370,588 A * | | 12/1994 | Sawase et al. .................. 475/84 |
| 6,059,680 A | | 5/2000 | Yoshioka |
| 6,120,407 A * | | 9/2000 | Mimura .................. 475/225 |
| 6,296,590 B1 | | 10/2001 | Gassmann |
| 6,811,511 B2 | | 11/2004 | Zeise |
| 6,817,434 B1 * | | 11/2004 | Sweet .................. 180/245 |
| 7,081,064 B2 * | | 7/2006 | Mueller et al. .................. 475/204 |
| 7,338,404 B2 * | | 3/2008 | Gassmann et al. .................. 475/231 |
| 7,503,416 B2 * | | 3/2009 | Sharma et al. .................. 180/247 |
| 7,507,178 B2 * | | 3/2009 | Rosemeier et al. .................. 475/205 |
| 2002/0142877 A1 * | | 10/2002 | Williams et al. .................. 475/198 |
| 2004/0026148 A1 * | | 2/2004 | Matsuno .................. 180/248 |
| 2005/0266953 A1 * | | 12/2005 | Puiu .................. 475/205 |
| 2007/0095592 A1 * | | 5/2007 | Yang .................. 180/245 |

FOREIGN PATENT DOCUMENTS

| | | |
|---|---|---|
| DE | 101 47 681 | 4/2003 |
| DE | 101 03 789 | 7/2004 |
| DE | 10 2004 002 195 | 8/2005 |
| DE | 10 2004 039 266 | 8/2006 |

OTHER PUBLICATIONS

Jürgen Stockmar, Das große Buch der Allradtechnik, 2004, pp. 95, 130, 131 (with English Abstract).

* cited by examiner

*Primary Examiner*—Lesley Morris
*Assistant Examiner*—Tashiana Adams
(74) *Attorney, Agent, or Firm*—Knobbe, Martens, Olson & Bear, LLP (57) ABSTRACT

An axle drive unit for an all-wheel drive train comprises an input element which is connectable to an input shaft, such as a cardan shafts. The input shaft extends in a longitudinal direction. The drive unit comprises a power-split device, of which the input member is connected to the input element and of which the output members are connectable to driveshafts of the axle. The axle is oriented in a direction transverse to the longitudinal direction.

The input member and the output members of the power-split device are mounted rotatably about axes parallel to the longitudinal direction. An angle drive is arranged in each case between the output members of the power-split device and the driveshafts.

14 Claims, 5 Drawing Sheets

AXLE DRIVE UNIT FOR A DRIVE TRAIN

CROSS-REFERENCE TO RELATED APPLICATIONS

This application claims the priority of German patent application DE 10 2006 038 358 filed Aug. 9, 2006.

BACKGROUND OF THE INVENTION

The present invention relates to an axle drive unit for a drive train, in particular for a cut-in axle of an all-wheel drive train, with an input element which is connectable to an input shaft, such as a cardan shaft, extending in a longitudinal direction, and with a power-split device, of which the input member is connected to the input element and of which the output members are connectable to driveshafts of the axle which is oriented in a direction transverse to the longitudinal direction.

An axle drive unit of this type is generally known, for example from "Das große Buch der Allradtechnik" ["The big book of all-wheel technology"], Jür-gen Stockmar, 1st edition 2004, Stuttgart, page 95.

In recent years, there has been a trend, in drive trains for motor vehicles, towards all-wheel technology, specifically not only in cross-country vehicles, but also in road vehicles, such as passenger cars.

A distinction is made, in general, between a permanent all-wheel drive and a cut-in all-wheel drive. In the permanent all-wheel drive, the drive power of an engine is generally distributed to the axles (front axle and rear axle) via a longitudinal differential. In the cut-in all-wheel drive, one axle is driven constantly, and the other axle is cut in, as required.

Vehicles with a permanent all-wheel drive have disadvantages in terms of weight and efficiency on account of the comparatively complicated longitudinal differential. For this reason, nowadays, vehicles are mostly equipped with a cut-in all-wheel drive.

Cutting-in previously took place via dog clutches which could implement only two states (OPEN/SHUT). As a result, such dog clutches could, as a rule, be selected only at a standstill, which was usually sufficient for travelling across country. With the introduction of the all-wheel drive for road vehicles, cutting-in was to be possible even during travel. Furthermore, for such road vehicles, cutting-in was to take place in an as automated manner as possible, that is to say require no action by the driver. For this purpose, self-locking clutch systems for cutting in the second axle were developed. These were, in the first place, visco-clutches, such as are shown, for example, in "Das große Buch der Allradtechnik" ["The big book of all-wheel technology"], Jürgen Stockmar, 1st edition 2004, page 95. The axle drive unit shown there has a hang-on clutch which is designed as a visco-clutch and which is connected on the input side to a cardan shaft and is connected on the output side, via a single angle drive, to a transverse differential of the cut-in axle.

Furthermore, it is known to arrange in the region of a cut-in rear axle, adjacently to the transverse differential, a multiple-disc clutch activated by means of a pump which is put into operation in the case of a differential rotational speed between the front axle and the rear axle. The higher the differential rotational speed is, the higher is the pressure generated by the pump.

The multiple-disc clutch is likewise a hang-on clutch and is connected between a differential cage of the transverse differential and a crown wheel of an angle drive. A drive pinion of the angle drive is connected with the cardan shaft which runs from the front axle to the rear axle.

In self-locking differentials which exert a locking action on account of a differential rotational speed between the axles, a foresighted cut-in is usually not possible.

For this reason, there is a trend towards electronically regulatable hang-on clutches which are activated by a drive dynamics controller and assist in stabilizing the vehicle in specific driving situations.

The advantage of installing the hang-on clutch in the region between the cardan shaft and an angle drive to the cut-in axle is that, although the rotational speeds to be transmitted are relatively high, the torque to be transmitted via such hang-on clutches is nevertheless correspondingly lower.

When the hang-on clutch is arranged between the crown wheel and the differential cage, the torque is higher by the amount of the step-up of the angle drive, so that the hang-on clutch has to be of a comparatively bulky design.

Concepts for hang-on axle drive units are also known in which the hang-on clutch is mounted between a driven shaft of the transverse differential of the cut-in axle and the corresponding side wheel. When the hang-on clutch is installed at this location, the clutch has to transmit only half the axle torque.

In so far as the drive train is to be used for dynamically influencing the driving behaviour about the yaw axis, active yaw systems, as they are known, are employed. Suitable axle drive units are mentioned on pages 130 and 131 of the above-mentioned prior art "Das große Buch der Allradtechnik" ["The big book of all-wheel technology"].

BRIEF SUMMARY OF THE INVENTION

Against the above background, the object of the present invention is to specify an improved axle drive unit for an all-wheel drive train.

In the axle drive unit mentioned in the introduction, this object is achieved in that the input member and the output members of the power-split device are mounted rotatably about axes parallel to the longitudinal direction and an angle drive is arranged in each case between the output members of the power-split device and the driveshafts.

The axle drive unit according to the invention makes it possible, by virtue of the power-split device oriented in the longitudinal direction, that a hang-on friction clutch with high efficiency can be integrated into the axle drive unit.

Thus, it is particularly advantageous if at least one output member of the power-split device is connectable to the assigned angle drive via a friction clutch.

In this embodiment, a hang-on friction clutch is to be integrated into the axle drive unit optimally in terms of torque and of weight.

In this case, it is advantageous that a hang-on all-wheel solution can be implemented by means of only a single friction clutch between the output member of the power-split device and the assigned angle drive. The other output member may in this case be connected fixedly in terms of rotation to the assigned angle drive.

Since, in particular, angle drives on the driven side of a cardan shaft possess, as a rule, a step-up $i \geq 1.5$, in particular $i \geq 2$, the power-split device and the friction clutch have to transmit markedly lower torques than in a situation in which these structural elements are arranged behind an angle drive, as seen in the drive direction.

Moreover, since the friction clutch is arranged behind the power-split device, as seen in the drive direction, the friction clutch, as a rule, has to transmit only half the input-shaft torque. Thus, both the power-split device and the friction clutch may have markedly smaller dimensioning, which may entail weight benefits and, in the case of larger production volumes, even cost benefits.

In the case of a lower torque to be transmitted, the friction clutch may be activated with lower pressure forces or be designed with fewer discs.

Admittedly, according to the invention, two angle drives are necessary, in contrast to the prior art in which there is generally only one angle drive. However, the two angle drives in each case have to transmit only half the torque and can therefore be designed to be markedly smaller.

It is particularly advantageous if the power-split device is a differential gear.

Such a differential gear serves, in this case, as a balancing gear for the assigned axle. Since the differential gear is arranged in front of the angle drives, it has to transmit only the input-shaft torque which is lower by the amount of the factor i of the step-up of the angle gear (axle step-up). The differential gear can therefore have markedly smaller dimensioning.

It is particularly advantageous, furthermore, if the differential gear is oriented in the longitudinal direction and its output members are connected to shafts which extend parallel in the longitudinal direction to the angle drives.

The differential gear may be a bevel-wheel or crown-wheel differential.

In this case, at least one of these shafts extends in the longitudinal direction through the differential gear, so that a bolt of the differential gear does not extend through the centre of the differential gear.

According to a preferred embodiment, the differential gear is a planet-wheel differential.

Such a planet-wheel differential can have a compact design in the longitudinal direction and, because of the relatively lower transmitted torques, can also have a comparatively compact design in the radial direction.

In this case, it is particularly advantageous if the sun wheel of the planet-wheel differential forms an output member of the differential gear. The sun wheel can then be connected in a simple way to a longitudinally oriented shaft which is connected to the assigned angle drive.

According to a further preferred embodiment, the ring wheel of the planet-wheel differential forms the input member.

This embodiment is preferred from a structural point of view since, for example, a shaft connected fixedly in terms of rotation to the sun wheel can be mounted on the ring wheel or on a part connected fixedly in terms of rotation to the latter.

According to a further preferred embodiment of the axle drive unit according to the invention, one output member is connectable to an inner shaft and the other output member to a hollow shaft which is mounted coaxially around the inner shaft.

In so far as a friction clutch is provided as a hang-on clutch, this is preferably connected between the other output member and the hollow shaft. The axle drive unit can thus have a compact design in a longitudinal direction. The friction clutch is preferably arranged directly adjacently to the differential gear.

According to a further preferred embodiment, the angle drives are designed as crown-wheel angle drives.

As a result, the running behaviour of the angle drives can be ensured even in the case of relatively high tolerances of the driving shafts (having the gearwheels) in the longitudinal direction. The mounting of the crown wheels can often also be implemented more simply.

However, bevel-wheel angle drives or the like may also be used alternatively as angle drives.

Furthermore, it is particularly preferred if wheels, connected to the drive-shafts, of the angle drives are arranged so as to be offset with respect to one another in the longitudinal direction.

This refinement makes it possible to drive the wheels of the two angle drives from an inner shaft and a ring wheel mounted coaxially about the latter.

The offset in the longitudinal direction can be compensated on the drive-shafts by means of constant velocity joints.

According to a further preferred embodiment, wheels, connected to the driveshafts, of the angle drives are arranged back to back and coaxially to one another for mutual axial support.

In this embodiment, a type of construction which, overall, is highly compact in the longitudinal direction can be achieved, if appropriate with an intermediate shaft being provided in order to allow a drive of the wheels pointing away from one another.

Furthermore, it is preferable if a transverse locking clutch is integrated into the axle drive unit.

This makes it possible to improve traction even further, particularly under μ-split conditions.

In general, such a transverse locking clutch may be integrated in any desired way.

It is particularly preferred, however, if the transverse locking clutch is connected between the output members of the differential gear.

In this way, the output members can be firmly connected to one another via the transverse locking clutch in a structurally simple way, in order thereby to set up a transverse lock.

It will be appreciated that the transverse locking clutch, and also the friction clutch, may each be designed as a multiple-disc clutch which is controlled electronically. The actuation of the friction clutches may generally take place hydraulically, but, alternatively, also electromechanically or otherwise. It is also conceivable to provide a common actuator for the hang-on clutch and the transverse locking clutch.

Overall, according to an alternative embodiment, there is provision for the power-split device to connect the input member firmly to the output members and for each output member to be connected to the respective angle drive via an assigned friction clutch.

In this alternative embodiment, the axle drive unit may be designed as an active yaw unit, in which case the drive torque can be distributed, as desired, to the left-hand and the right-hand wheel of the axle, depending on the closing state of the two clutches. It is also conceivable to provide additional measures for varying the transmission ratio, in order to impart different rotational speeds to the wheels of the axle in a directed manner.

It will be appreciated that the features mentioned above and those yet to be explained below may be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
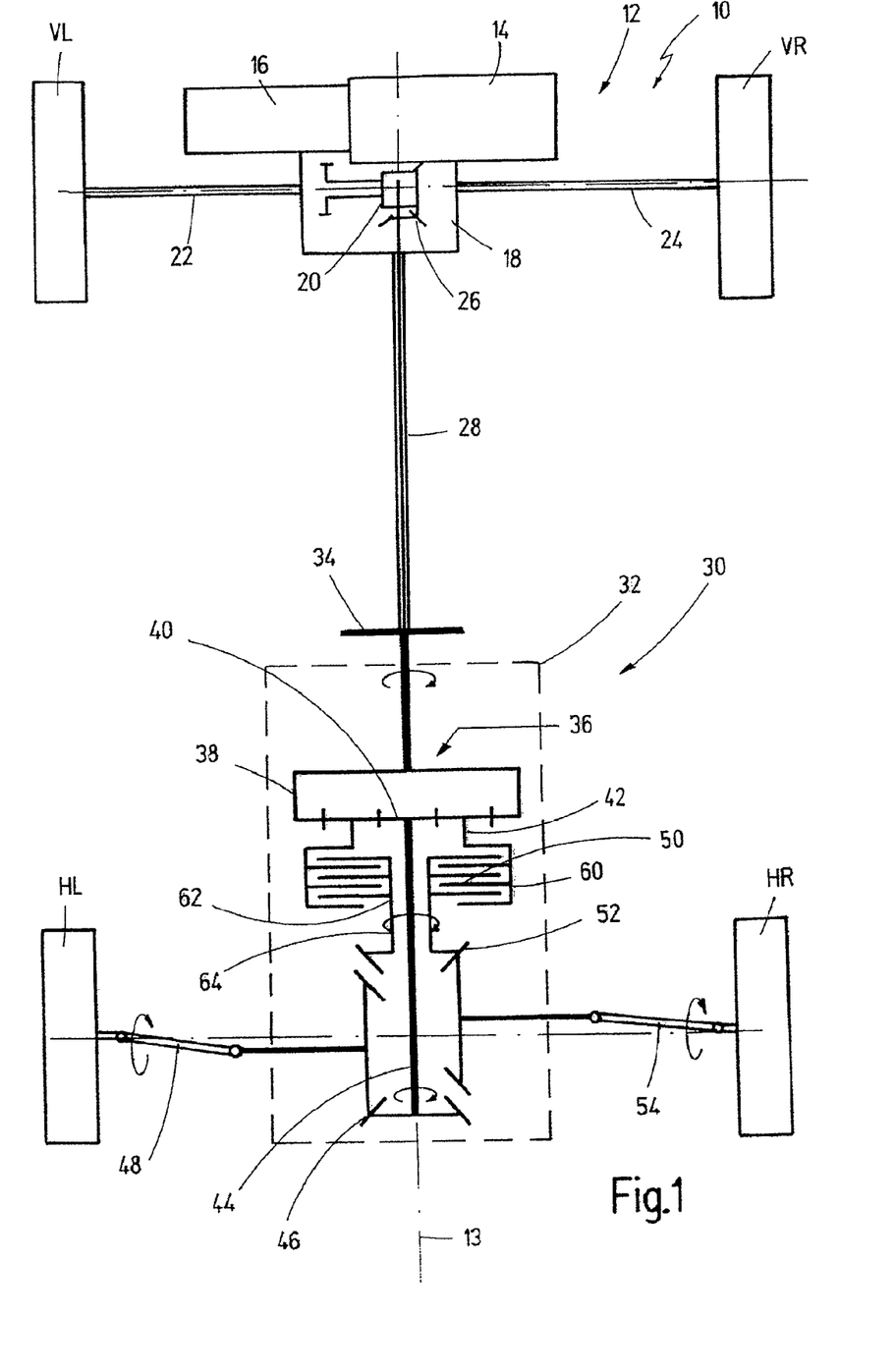
FIG. 1 shows a diagrammatic top view of a motor vehicle with an all-wheel drive train, into which an axle drive unit according to a first embodiment of the present invention is integrated.

In FIG. 1, a motor vehicle, such as a passenger car, which is designed, in particular, for road traffic, but, if appropriate, also for travelling across country, is designated in general by 10.

The motor vehicle 10 has an all-wheel drive train 12. A longitudinal axis of the motor vehicle 10 is designated in general by 13.

The front axle of the drive train 12 has front wheels VL, VR. The rear axle of the drive train 12 has rear wheels HL, HR.

In the region of the front axle, an engine 14 is provided, for example an internal combustion engine, an electric motor, a hybrid drive unit, etc.

At the output of the engine 14, a multi-step transmission 16 is provided, such as is generally conventional for internal combustion engines. In other types of engines, a multi-step transmission may, if appropriate, even be dispensed with.

The output of the multi-step transmission 16 is connected to a power divider 18. The power divider 18 is likewise arranged in the region of the front axle and contains a transverse differential 20. An output (final drive) of the multi-step transmission 16 is connected to an input member of the transverse differential 20. The output members of the transverse differential 20 are connected respectively to a front left driveshaft 22 and a front right driveshaft 24 which are connected to the front wheels VL, VR.

The output of the multi-step transmission 16 is connected, furthermore, in the power divider 18, via an angle gear 26, to a cardan shaft 28 which extends in the longitudinal direction 13 to the rear axle.

The cardan shaft 28 is connected to an input element 34 of an axle drive unit, designated in general by 30, which distributes the drive power to the rear wheels HL, HR.

The axle drive unit 30 has a housing 32, indicated diagrammatically. The input element 34 of the axle drive unit 30 is connected to the cardan shaft 28.

A power-split device 36 in the form of a planet-wheel differential 36 is provided in the housing 32 of the axle drive unit 30. The planet-wheel differential 36 may be designed as a double planet-wheel differential, so that the directions of rotation, depicted in FIG. 1, of the respective shafts can be achieved.

The power-split device 36 in the form of the planet-wheel differential has an input member 38 which is formed by the ring wheel and which is connected fixedly in terms of rotation to the input element 34. A first output member 40 of the planet-wheel differential 36 is formed by the sun wheel. A second output member 42 is formed by the planet carrier.

The first output member 40 is connected fixedly in terms of rotation to a longitudinal shaft 44 (core shaft) which runs rearwards in the longitudinal direction 13 and which is coupled to a first angle drive 46. The first angle drive 46 is connected to a rear left driveshaft 48 which is connected to the wheel HL.

The second output member 42 is connected to a second angle drive 52 via a friction clutch 50. The second angle drive 52 is connected to the rear right driveshaft 54 which is connected to the wheel HR.

The friction clutch 50 is designed as a multiple-disc clutch, for example as a wet-running multiple-disc clutch. The friction clutch 50 is actuable by means of a suitable actuator assembly (not illustrated). This actuator assembly is activatable by means of a suitable electronic control device (not shown).

The friction clutch 50 has an input member (here, an outer-disc carrier) 60 which is connected fixedly in terms of rotation to the second output member 42 (or is produced in one piece with this).

An output member (here, inner-disc carrier) 62 of the friction clutch 50 is connected to a hollow shaft 64 which surrounds the longitudinal shaft 44 concentrically. The friction clutch 50 is arranged directly behind the power-split device 36 in the form of the planet-wheel set, as seen in the drive direction from the front axle to the rear axle. Furthermore, as seen in the drive direction, the angle drive (here, the second angle drive) 52, which is connected to the hollow shaft 64, is arranged in front of the other angle drive (here, the first angle drive) 46, which is connected to the longitudinal shaft (core shaft) 44.

The axle drive unit 30 operates as follows. The ring wheel 38 of the plant-wheel differential 36 is driven constantly. The shafts 44, 64 rotate according to the rational speeds of the rear wheels HL, HR. With the friction clutch 50 open, the power led to the ring wheel 38 cannot be transmitted to either of the two output members 40, 42. In this case, the motor vehicle 10 operates only by means of the drive of the front axle (front wheels VL, VR).

In so far as the friction clutch 50 is closed, that is to say transmits torque, the plant wheel differential acts as a differential gear which distributes the power led to the ring wheel 38 to the two output members 40, 42 in equal parts. The axle drive unit 30 consequently acts as a longitudinal lock, so that both the front axle and the rear axle are driven, typically in a ratio of 50:50%.

By the friction clutch being capable of being activated electronically, slip states of the friction clutch 50 can also be set, so that the drive power can be distributed between the front axle and the rear axle within wide limits. It would be appreciated that the control electronics preferably have foresighted properties, that is to say, for example, takes into account the steering lock, yawing rate, transverse acceleration, etc., in order to achieve an optimal and ideally foresighted distribution of drive power.

Since the planet-wheel differential 36 acts as a transverse differential to the rear axel, but, in contrast to conventional transverse differentials, transmits only the torque transmitted via the cardan shaft 28, the transverse differential 36 may have markedly smaller dimensioning.

The same applies to the friction clutch 50 which, in the closed state, has to transmit only half the torque transmitted via the cardan shaft 28.

Two angle drives 46, 52 are provided in the axle drive unit 30. However, even these in each case transmit only half of the torque, as compared with a conventional single angle drive on a hang-on axle. The angle drives 46, 52, too, can therefore in each case have smaller dimensioning. This results, overall, in major weight and cost benefits.

Thus, with functionality being the same, by the friction clutch 50 and the transverse differential 36 being mounted in each case in the position optimal in terms of torque, their component size, their weight and therefore material costs are minimized.

The wheel sets may in this case each be designed to be smaller or with less strength, since the power is split in the transverse differential 36 and therefore in each case only half the torque is transmitted.

The embodiment, illustrated in FIG. 1, of a drive train 12 may be modified, for example, as follows. For example, an axle drive unit 30 may also be provided on a front axle if, for example, the engine 14 is arranged on the rear axle. It is also conceivable, however, in an arrangement of the engine in the region of the front axle (for example, with longitudinal installation) or as a middle engine, to drive the rear axle constantly and to design the front axle as a hang-on axle via a corresponding axle drive unit 30.

The use of a double planet differential 36 is advantageous because of the achievable directions of rotation of the individual members, but is not necessary. Other types of differentials may also be employed.

As stated, the friction clutch 50 may be activated hydraulically, but may also be activated via an electromechanical actuator assembly, via a ball ramp or the like.

Figure 2:
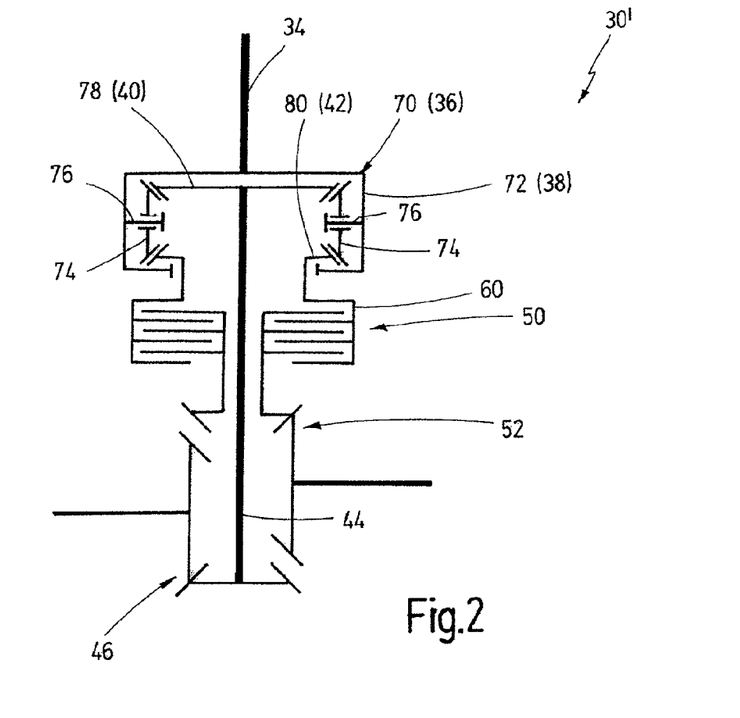
FIG. 2 shows a diagrammatic illustration of an alternative embodiment of an axle drive unit according to the invention.

One example of a modified embodiment of an axle drive unit is designated in general by 30' in FIG. 2.

In this figure, as in the following figures, the general functioning and the general set-up of the axle drive unit are generally identical to the embodiment described with regard to FIG. 1. Identical parts are therefore given the same reference symbols. Only the differences are explained below.

Thus, the axle drive unit 30' has a bevel-wheel differential 70 instead of a planet-wheel differential 36. The bevel-wheel differential 70 has a differential cage 72 which forms the input member 38 and is connected to the input element 34.

Balancing bevel wheels 74 are connected rotatably and in an axially fixed manner to the differential cage 72 via bolt portions 76, the differential cage 72 being rotatable about an axis parallel to the longitudinal axis 13. The bolt portions 76 are connected fixedly in terms of rotation to the differential cage 72.

The bevel-wheel differential 70 does not have any bolts passing through the axle, but, instead, bolt portions 76 which carry the balancing bevel wheels 74.

A first output bevel wheel 78 arranged at the front in the drive direction is connected to the longitudinal shaft 44. A second output bevel wheel 80 forms the second output member 42 and is connected to the outer-disc carrier 60.

The rest of the set-up of the axle drive unit 30' is identical to the axle drive unit 30 of FIG. 1.

Figure 3:
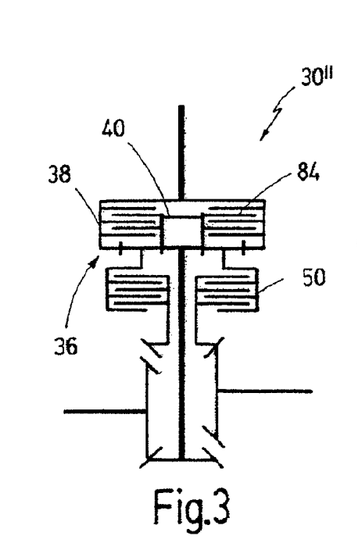
FIGS. 3-5 show alternative embodiments of axle drive units according to the invention, into each of which a transverse locking clutch is integrated.
Figure 4:
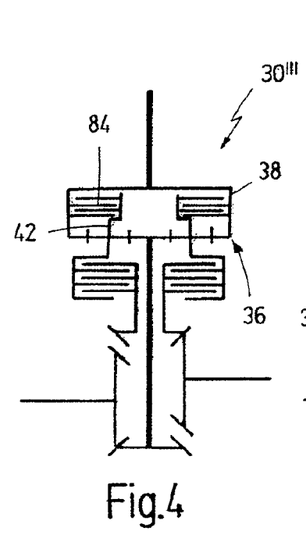
Figure 5:
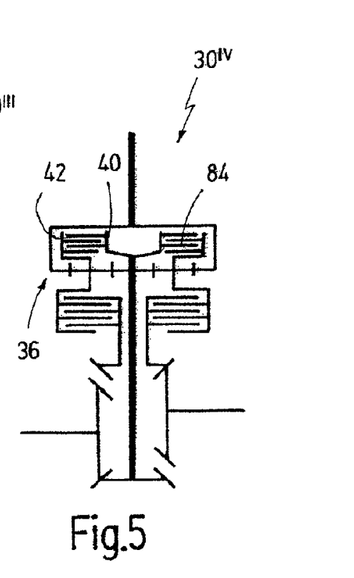

FIGS. 3 to 5 illustrate, in each case in diagrammatic form, how a transverse locking clutch 84 can be integrated into the axle drive unit 30.

FIG. 3 shows an axle drive unit 30", in which a transverse locking clutch 84 is connected between the input member 38 and the first output member 40 of the planet-wheel differential 36.

The axle drive unit 30''' shown in FIG. 4 has a transverse locking clutch 84 which is connected between the input member 38 and the second output member 42 of the planet-wheel differential 36.

In the axle drive unit 30$^{IV}$ of FIG. 5, a transverse locking clutch 84 is connected between the two output members 40, 42. This embodiment is considered to be particularly preferable.

It will be appreciated that, in all three cases illustrated, the transverse locking clutch 84 may be, in exactly the same way as the friction clutch 50, a friction clutch actuated by an actuator assembly and activatable by means of an electronic control device, and, for example, in the form of a wet-running multiple-disc clutch. The actuator assembly for the friction clutch 50 and the transverse locking clutch 84 may, if appropriate, be integrated into a structural unit.

By means of the transverse locking clutch 84, the differential action of the planet-wheel differential 36 can be cancelled, so that the wheels of the locked axle are connected essentially fixedly in terms of rotation to one another.

Figure 6:
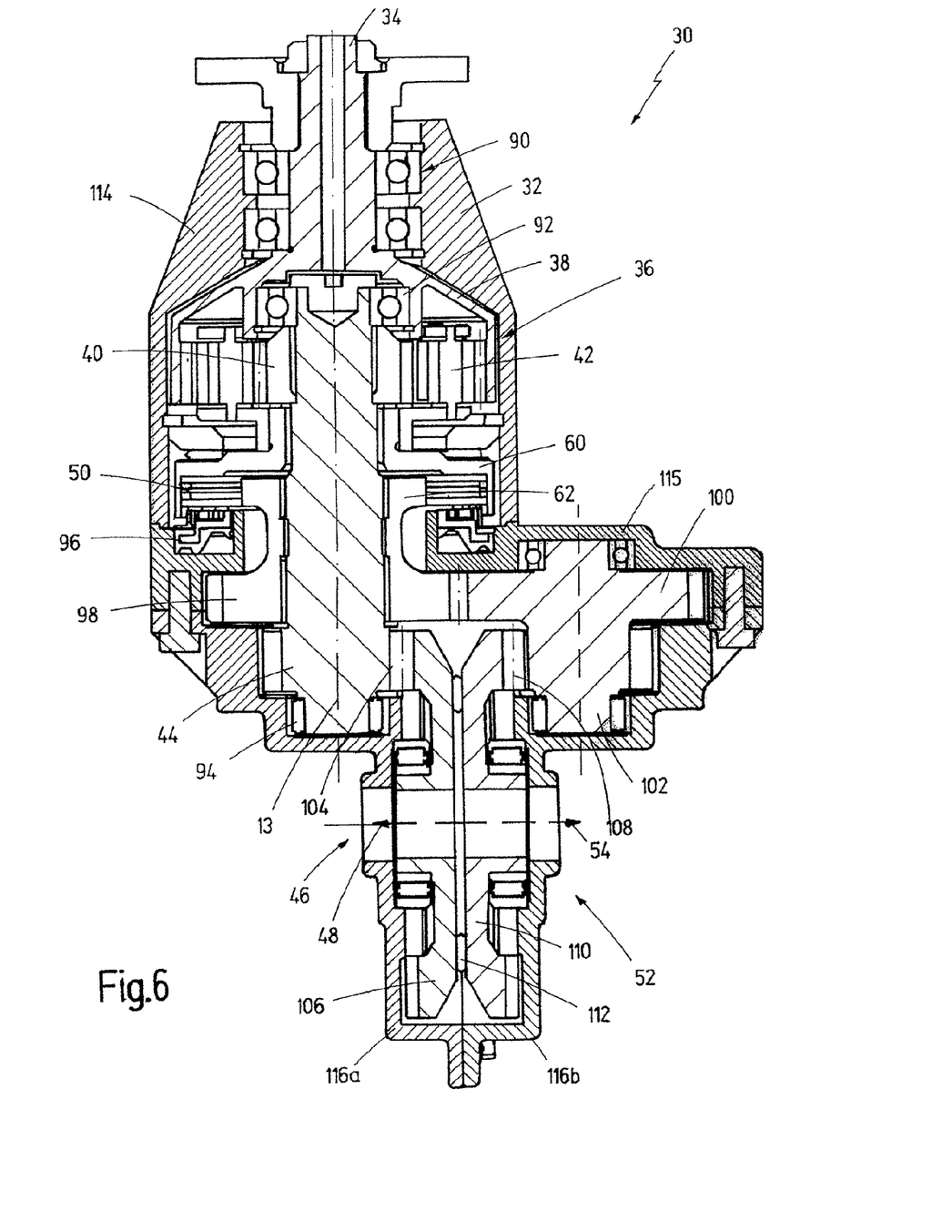
FIG. 6 shows a longitudinal sectional view through an axle drive unit according to a further embodiment of the present invention.

FIG. 6 shows a first structural solution for an axle drive unit 30 according to the present invention.

An input shaft 34 is mounted rotatably and in an axially fixed manner in the input-side region of the housing 32 by means of a bearing arrangement 90. The input shaft 34 is connected in one piece to the ring wheel 38 of the planet-wheel differential (double planet differential).

The longitudinal shaft 44, which is connected to the sun wheel 40, is mounted rotatably by means of a first longitudinal-shaft bearing 92 and a second longitudinal-shaft bearing 94. The first longitudinal-shaft bearing 92 is in this case secured to a web of the ring wheel 38, so that the longitudinal shaft 44 is mounted in relation to the input shaft 34 in this region.

The second longitudinal-shaft bearing 94 is supported on the housing 32.

The friction clutch 50 is arranged directly adjacent the planet-wheel differential 36, as seen in the drive direction. The planet carrier 42 (second output member) is connected fixedly in terms of rotation to the outer-disc carrier 60 of the friction clutch 50.

The inner-disc carrier 62 is designed as a hollow-shaft portion which is mounted rotatably on the longitudinal shaft 44 via suitable bearings.

A hydraulic actuator 96 is secured to the housing 32 adjacent the friction clutch 50, as seen in the drive direction, and serves for acting upon the friction clutch 50 with hydraulic pressure. More precisely, when pressure acts upon a piston in the actuator 96, as a rule, a pressure force acts on a disc stack of the friction clutch 50, thus making the frictional transmission of torque possible.

The outer-disc carrier 60 is supported, opposite to the drive direction, via an axial bearing, not designated in any more detail, which rolls on a thrust washer, likewise not designated in any more detail, which is fixed axially to the transmission housing 32 via a spring ring. In the drive direction, the outer-disc carrier 60 is supported via a pressure piston, not designated in any more detail, of the actuator 96 and a subassembly, not designated in any more detail, of the actuator 96, the said subassembly consisting of an axial bearing, of a close-tolerance washer and of a corrugated spring.

The corrugated spring ensures that, when the hydraulic pressure decreases, the multiple-disc clutch is opened again.

A gearwheel 98 is secured to the inner-disc carrier 62 behind the actuator 96, as seen in the drive direction. The gearwheel 98 is in engagement with a gearwheel 100 which is secured to an intermediate shaft 102 or is produced in one piece with the latter.

The intermediate shaft 102 is mounted rotatably, parallel to the longitudinal shaft 44, on the housing 32 or the intermediate housing 115.

A further gearwheel 108 is secured to the intermediate shaft 102.

A gearwheel 104 is secured, at the same axial height, to the longitudinal shaft 44 and forms part of the first angle drive 46 which in the present case is designed as a crown-wheel angle drive.

The angle drive 46 consequently also contains a crown wheel 106 which is mounted rotatably on the housing 32 about an axis transverse to the longitudinal axis 13.

The gearwheel 108 is correspondingly secured to the intermediate shaft 102 and is in engagement with a crown wheel 110, the gearwheel 108 and the crown wheel 110 forming the second angle drive 52.

The two crown wheels 106, 110 are arranged back to back, an axial bearing (for example an axial needle bearing) 112 being arranged between them so that axial forces introduced into the crown wheels 106, 110 can be suitably supported.

In this arrangement, in each case only one radial bearing is necessary for the rotary mounting of the crown wheels 106, 110.

The housing 32 is constructed from a first housing part 114 and at least one second housing part 116, the parting plane of which runs approximately transversely with respect to the longitudinal axis 13. The first housing part 114 is arranged at the front, as seen in the drive direction, the input shaft 34 being mounted on the first housing part 114.

Between the first housing part 114 and the second housing part 116 is secured an intermediate housing 115, to which, for example, the actuator 96 and a bearing for mounting the intermediate shaft 102 can be secured.

In the present case, the second housing part 116 is constructed in two parts from a part 116a and a part 116b, the parting plane of which runs approximately parallel to the longitudinal axis 13. The parts 116a, 116b of the second housing part 116 enclose between them, as seen in the transverse direction, the two crown wheels 106, 110.

The bearing 94 and the bearing for the crown wheel 106 are secured to the part 116a and a second bearing for the intermediate shaft 102 and the bearing for the crown wheel 110 are secured to the part 116b.

The crown wheels 106, 110 are connected fixedly in terms of rotation to the driveshafts 48, 54 via a suitable toothing.

The step-up of the angle drives 46, 52 is in the present instance in each case higher than 2.

Figure 7:
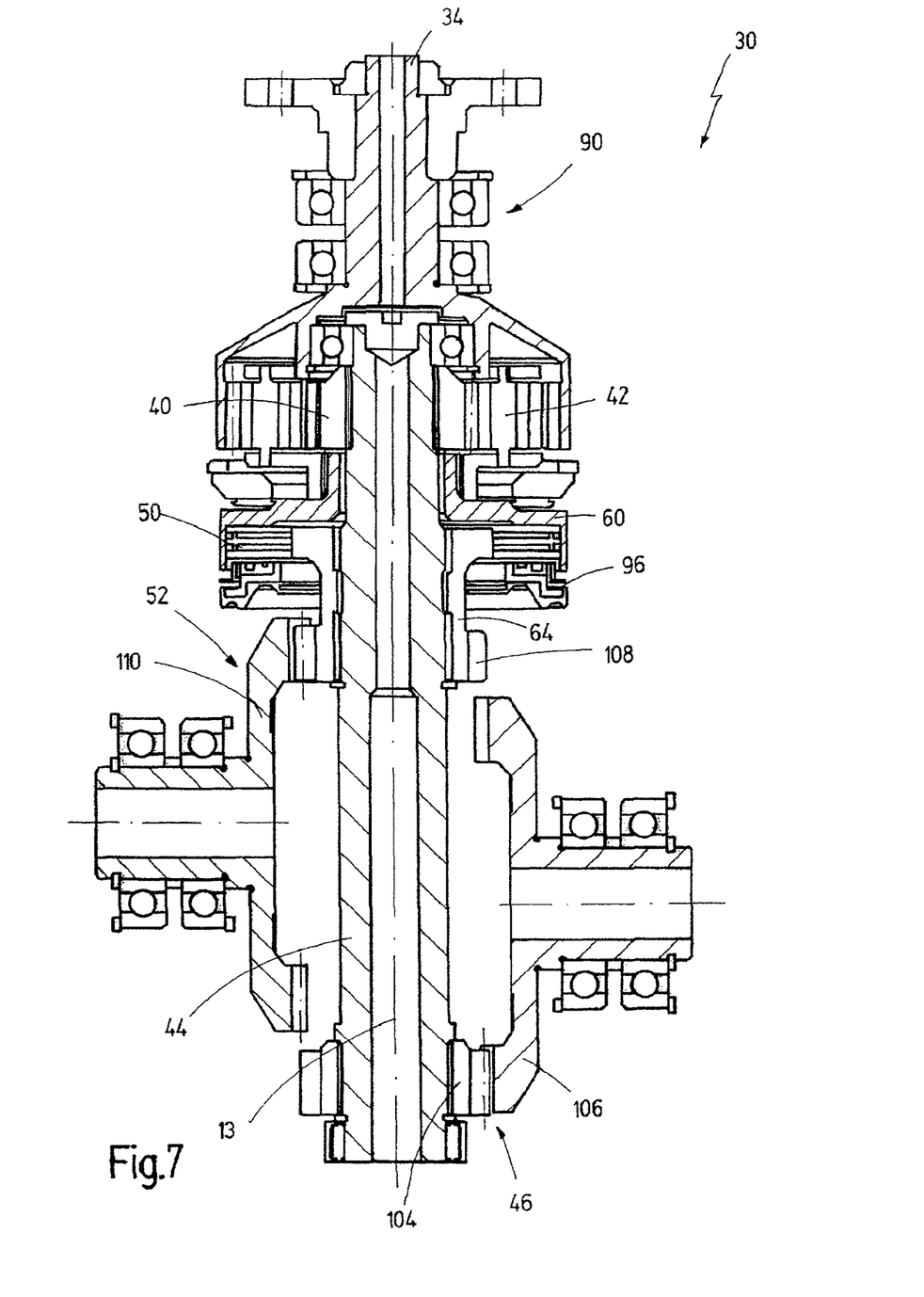
FIG. 7 shows a longitudinal sectional view through a further embodiment of an axle drive unit according to the present invention.

FIG. 7 illustrates a further design of an embodiment of an axle drive unit 30.

The axle drive unit 30 of FIG. 7 largely corresponds to the axle drive unit 30 of FIG. 6, and therefore only the differences are dealt with below.

Thus, the longitudinal shaft 44 is designed to be longer in the axial direction and at its rear end in the drive direction carries the gearwheel 104 which is in engagement with the crown wheel 106. In this case, the crown wheels 106, 110 are arranged on opposite sides of the shaft 44 and point with their toothings towards one another.

The crown wheels 106, 110 are in this case arranged so as to be offset with respect to one another in the longitudinal direction, so that their axes of rotation are offset with respect to one another in the longitudinal direction, for example by an amount <20 mm, in particular <15 mm.

More precisely, the axial offset is determined essentially by the width of the gearwheels 108, 104 which are oriented coaxially with respect to one another.

The axle drive unit 30 of FIG. 7 does not require any intermediate shaft 102 because of this arrangement and can consequently be of markedly more compact design in the radial direction.

The crown wheels 106, 110 are in this instance in each case to be mounted in a somewhat more complicated manner, for example illustrated in each case by a double ball-bearing arrangement which can also absorb axial forces.

Figure 8:
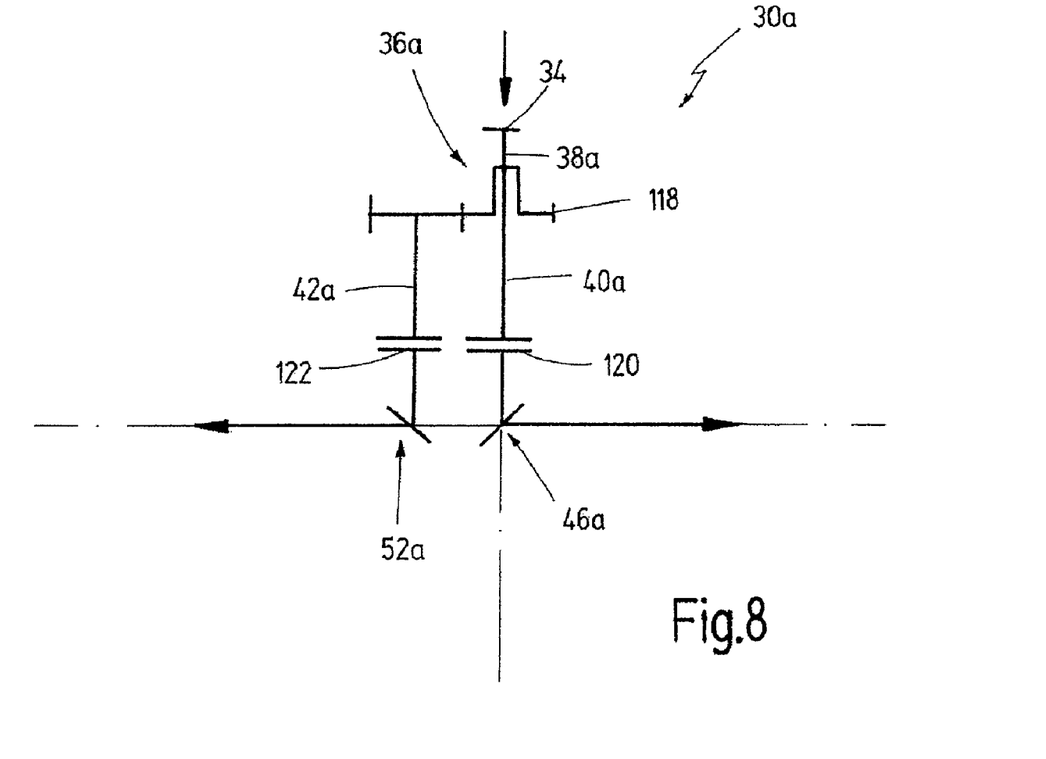
FIG. 8 shows a diagrammatic illustration of a further embodiment of an axle drive unit according to the invention with active yaw control.

FIG. 8 shows an alternative embodiment of an axle drive train 30a in diagrammatic form.

In the axle drive train 30a, the input element 34 is connected to a power-split device 36a which connects an input member 38a firmly, that is to say invariably, to two output members 40a, 42a. For this purpose, the power-split device 36a may have a wheel set 118 so that the two output members 40a, 42a can run parallel to one another.

In an alternative embodiment, these output members 40a, 42a may also be arranged coaxially to one another.

In any event, each of the output members 40a, 42a is connected to the assigned angle drive 46a, 52a via a respective friction clutch 120, 122.

The two friction clutches 120, 122 are likewise designed, for example, as multiple-disc clutches, for example as wet-running multiple-disc clutches, which can be acitivated by means of any actuator assembly, but in any event are controlled electronically.

In this case, it is particularly advantageous if the two friction clutches 120, 122 can be activated independently of one another, so that drive torque can be distributed, as desired, to the left-hand or the right-hand wheel of the assigned axle. The axle drive unit 30a is consequently designed as an active yaw unit.

Figure 9:
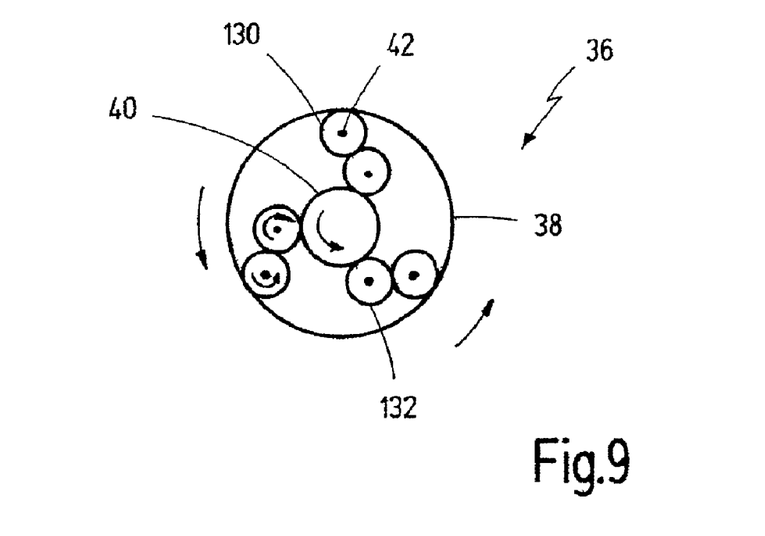
FIG. 9 shows a diagrammatic illustration of a double planet-wheel set.

FIG. 9 shows a double planet-wheel set 36 having a planet carrier 42, on which are provided first planets 130, which mesh with the ring wheel 38, and second planets 132, which mesh with the first planets 130 and the sun wheel 40. The respective direction of rotation are illustrated by arrows.

What is claimed is:

1. Axle drive unit for a drive train, with an input element which is connectable to an input shaft, extending in a longitudinal direction, and with a power-split device, of which the input member is connected to the input element, and of which a pair of output members are connectable to driveshafts are oriented in a direction transverse to the longitudinal direction, wherein the input member and the output members of the power-split device are mounted rotatably about axes parallel to the longitudinal direction, and an angle drive is arranged in each case between the output members of the power-split device and the driveshafts.

2. Axle drive unit according to claim 1, wherein at least one output member of the power-split device is connected to the assigned angle drive via a friction clutch.

3. Axle drive unit according to claim 1, wherein the power-split device is a differential gear.

4. Axle drive unit according to claim 3, wherein the differential gear is oriented in the longitudinal direction, and in that its output members are connected to shafts which extend parallel in the longitudinal direction to the angle drives.

5. Axle drive unit according to claim 3, wherein the differential gear is a planet-wheel differential.

6. Axle drive unit according to claim 5, wherein the sun wheel of the planet-wheel differential forms an output member.

7. Axle drive unit according to claim 1, wherein one output member is connected to an inner shaft and the other output member to a hollow shaft which is mounted coaxially around the inner shaft.

8. Axle drive unit according to claim 1, wherein the angle drives are designed as crown-wheel angle drives.

9. Axle drive unit according to claim 8, wherein the crown-wheel angle drives each have a crown wheel which is connected to a driveshaft.

10. Axle drive unit according to claim 1, wherein wheels, connected to the driveshafts, of the angle drives are arranged so as to be offset with respect to one another in the longitudinal direction.

11. Axle drive unit according to claim 1, wherein wheels, connected to the driveshafts, of the angle drives are arranged back to back and coaxially to one another for alternate axial mounting.

12. Axle drive unit according to claim 1, wherein a transverse locking clutch is integrated into the axle drive unit.

13. Axle drive unit according to claim 12, wherein the transverse locking clutch is connected actively between the output members of the differential gear.

14. Axle drive unit according to claim 1, wherein the power-split device connects the input member to the output members, and wherein each output member is connected to the respective angle drive via an assigned friction clutch.

* * * * *